United States Patent [19]

Yoshimoto et al.

[11] Patent Number: 5,119,218

[45] Date of Patent: Jun. 2, 1992

[54] LIQUID CRYSTAL DISPLAY DEVICE HAVING VARISTOR ELEMENTS

[75] Inventors: Hataaki Yoshimoto, Chiba; Katsuhiro Ito; Hiroshi Ichikawa, both of Ichihara; Takashi Honma, Chiba, all of Japan

[73] Assignee: Ube Industries, Ltd., Yamaguchi, Japan

[21] Appl. No.: 413,000

[22] Filed: Sep. 26, 1989

[30] Foreign Application Priority Data

| Sep. 28, 1988 | [JP] | Japan | 63-240658 |
| Sep. 29, 1988 | [JP] | Japan | 63-242518 |
| Feb. 17, 1989 | [JP] | Japan | 1-36092 |
| Apr. 26, 1989 | [JP] | Japan | 1-104736 |

[51] Int. Cl.⁵ .............................................. G02F 1/13
[52] U.S. Cl. .................................... 359/54; 359/57; 359/58; 359/81; 359/87
[58] Field of Search ............. 350/333, 334, 336, 344; 340/784

[56] References Cited

U.S. PATENT DOCUMENTS

4,772,099  9/1988  Kato et al. ........................ 350/334

FOREIGN PATENT DOCUMENTS

| 0073705 | 3/1983 | European Pat. Off. | |
| 0251629 | 7/1988 | European Pat. Off. | |
| 2561423 | 9/1985 | France | |
| 61-175624 | 8/1986 | Japan | 350/334 |
| 62-265626 | 11/1987 | Japan | 350/336 |
| 63-48527 | 3/1988 | Japan | 350/336 |

*Primary Examiner*—Rolf Hille
*Assistant Examiner*—Minhloan Tran
*Attorney, Agent, or Firm*—Finnegan, Henderson, Farabow, Garrett and Dunner

[57] ABSTRACT

A liquid crystal display device capable of displaying clear images without cross-talk, includes (a) a first transparent base, (b) a plurality of picture element electrodes on the first base (a), (c) a plurality of signal lines on the first base (a), (d) a plurality of varistor layers connecting the picture element electrodes (b) to the signal lines (c) therethrough, (e) a second transparent base in parallel to the first base (a), (f) a plurality of scanning electrodes on the second base (e), and (g) a liquid crystal material layer arranged between the picture element electrodes (b) and the scanning electrodes (f), and is characterized in that the scanning electrodes (f) have a size, shape and location satisfying a relationship with the varistor layers (d) such that a plurality of vacant spaces are formed between the scanning electrodes (f) and the varistor layers (d) face the vacant spaces but not the scanning electrodes.

17 Claims, 19 Drawing Sheets

LIQUID CRYSTAL DISPLAY DEVICE HAVING VARISTOR ELEMENTS

BACKGROUND OF THE INVENTION

1. Field of the Invention

The present invention relates to a liquid crystal display device. More particularly, the present invention relates to a liquid crystal display device which contains a liquid crystal material layer wherein liquid crystals are dispersed in a matrix comprising a polymeric material, and which is substantially free from "cross-talk" and can exhibit a high brightness.

2. Description of the Related Art

It is known that liquid crystal display (LCD) devices can be directly operated by using an IC device under a low drive voltage at a low power consumption, and can be constructed as a compact and thin device. In particular, a TN type LCD can be operated under a low voltage at a low power consumption, and thus is widely utilized in various fields; for example, watches and desk-type electronic calculators.

The recent growing popularity of word processors, personal computers and other data processing devices has led to a demand for portable, small and thin devices, and to this end, the LCD devices are replacing the cathode ray tube (CRT) devices as the display element in those machines. With the LCD device, it is possible to reproduce the image of Chinese characters on the screens of those machines, since a great number of picture elements can be used in the LCD device in comparison with the number of picture elements used in the display device used for watches and desk calculators. Also, the LCD element is operated by a matrix display drive in which picture element electrodes are connected to signal lines in an X-Y matrix form. In this type of LCD device, the picture element electrodes corresponding to the picture elements are not independent from each other, and thus when a predetermined voltage is applied to one picture element electrode, the voltage is also applied to the adjacent picture element electrodes, whereby they are partly operated. i.e., an undesirable "cross-talk" occurs between one picture element electrode and adjacent picture element electrodes.

To eliminate this cross-talk, it is known to use a non-linear element consisting of a diode, for example, a metal-insulator-metal diode (MIM), or thin film transistor (TFT) for each picture element electrode, nevertheless it is very difficult to provide and arrange a large number (for example, several thousands to several hundreds of thousands) of diodes or thin film transistors corresponding to a large number of picture elements, all of which must have uniform properties and be free from defects, and thus there is an urgent need for the development of non-linear elements which can be easily provided with a uniform quality and will allow the use of an LCD device with a large display area.

In connection with the above, a new type of liquid crystal material usable for a display in a large display area has been developed through a new technology involving a polymer dispersed type liquid crystal material. With this technology, it is now possible to easily control the thickness of the liquid crystal material layer in the display device, and therefore, the polymer-dispersed type liquid crystal material can be formed as a layer having a large surface area, exhibits a very quick response, and allows the resultant display device to be given a wide angle of view without the use of a polarizer plate, and thus can be advantageously utilized to provide an LCD device having a large display surface area.

Nevertheless, the polymer-dispersed type liquid crystal material is disadvantageous in that this liquid crystal material requires a drive voltage of several tens to several hundreds of volts, which is remarkably higher than that of the TN type liquid crystal material, e.g., 5 volts or less, and therefore, a non-linear element having a higher voltage resistance than that of conventional non-linear elements, for example, thin film elements, must be used for the polymer-dispersed type LCD device.

The inventors of the present invention attempted to use a layer consisting essentially of varistor particles as a non-linear element, which is the liquid crystal display device in which the above-mentioned varistor layer is used can display clear images without the occurrence of cross-talk, even where the polymer-dispersed liquid crystal material needing a high drive voltage is used.

Nevertheless, the above-mentioned display device is disadvantageous in that, when an outside surface of a varistor layer formed on a signal line and a picture element electrode is close to a scanning electrode, a current sometimes flows from the signal line to the scanning electrode through the varistor layer, or from the picture element electrode to the scanning electrode through the varistor layer, so that a voltage between the picture element electrode and the scanning electrode is reduced, and the brightness of the display device is reduced. The above-mentioned disadvantages become significant with a decrease in the thickness of the liquid crystal material layer.

Usually, the varistor layer forms a convexity on a base plate in the liquid crystal display device, and this results in a relatively large thickness of the resultant liquid crystal display device. Also, the properties of the varistor layer may be deteriorated by solvent or additives contained in the liquid crystal material layer formed on the varistor layer.

In general, preferably the liquid crystal display device can be operated under a low drive voltage, and accordingly, the liquid crystal material layer has as small a thickness as possible. When the thickness of the liquid crystal material layer is reduced, however, the outside face of the varistor layer in the form of a convexity on the base plate comes into contact with an electrode formed on the opposite base plate, and if the thickness of the varistor layer is reduced to avoid the above-mentioned disadvantage, the deviation in the varistor voltage is increased.

Accordingly, desirably a liquid crystal display device having a stable varistor voltage and able to be operated under a low drive voltage is provided.

Furthermore, when each picture element electrode has a small size, and therefore the width of the varistor layer through which a signal line is connected to the picture element electrode is small, a threshold value voltage (Vth) of the varistor tends to fluctuate, and therefore, the contrast of each picture element becomes uneven.

SUMMARY OF THE INVENTION

An object of the present invention is to provide a liquid crystal display device substantially free from cross-talk and capable of exhibiting a high brightness.

Another object of the present invention is to provide a liquid crystal display device capable of being operated under a low drive voltage without fluctuation in a threshold value voltage (Vth).

Still another object of the present invention is to provide a liquid crystal display device in which the properties of a non-linear varistor layer can be maintained at a constant level for a long time under a relatively low drive voltage while exhibiting a satisfactory display.

The above-mentioned objects can be attained by the liquid crystal display device of the present invention which comprises: a first transparent base; a plurality of picture element electrodes arranged on the first base; a plurality of signal lines for supplying electric signals to the picture element electrodes, arranged adjacent to the picture element electrodes on the first base; a plurality of varistor layers comprising fine varistor particles, through which the picture element electrodes are connected to the adjacent signal lines; a second transparent base arranged in parallel to and spaced from the first base; a plurality of scanning electrodes arranged on the second base and facing to and spaced from the picture element electrodes; and a liquid crystal material layer arranged between the picture element electrodes and the scanning electrodes. The scanning electrodes have a size, shape and location satisfying a relationship to the varistor layers such that a plurality of vacant spaces are formed between the scanning electrodes, and the varistor layers face the vacant space but not the scanning electrodes in a direction at a right angle from the first and second base surfaces.

DESCRIPTION OF THE PREFERRED EMBODIMENTS

Figure 1A:
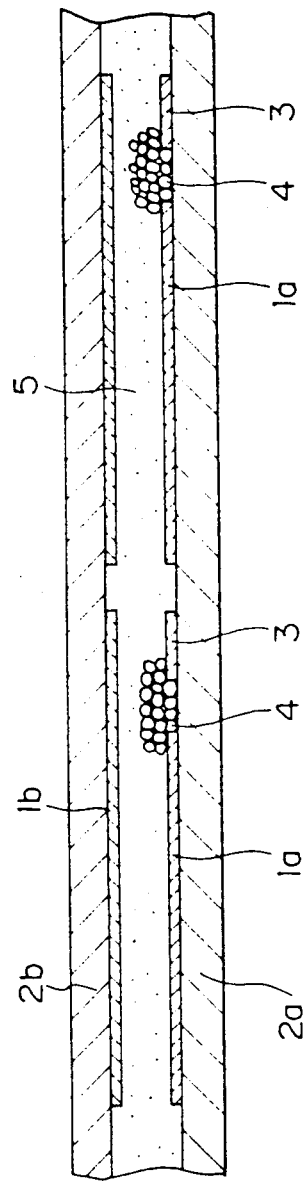
FIG. 1(A) is an explanatory cross-sectional view of a polymer dispersed type liquid crystal display device in the prior art.

FIG. 1(A) shows a partial cross-section of a conventional liquid crystal display device in the prior art.

In FIG. 1(A), a plurality of picture element electrodes 1a are arranged in a predetermined pattern on an upper face of a first transparent base 2a; a plurality of signal lines 3 for supplying electric signals to the picture element electrodes 1a are arranged adjacent to the picture element electrodes 1a on the first base; a plurality of non-linear elements each consisting of a varistor layer 4 are arranged between and electrically connect the picture element electrodes 1a and the signal lines 3; a second transparent base 2b is arranged in parallel to and spaced from the first base 2a; a plurality of transparent scanning electrodes 1b are fixed to the lower face of the second base 2b; and the space between the first base 2a and the second base 2b is filled by a liquid crystal material 5.

Figure 1B:
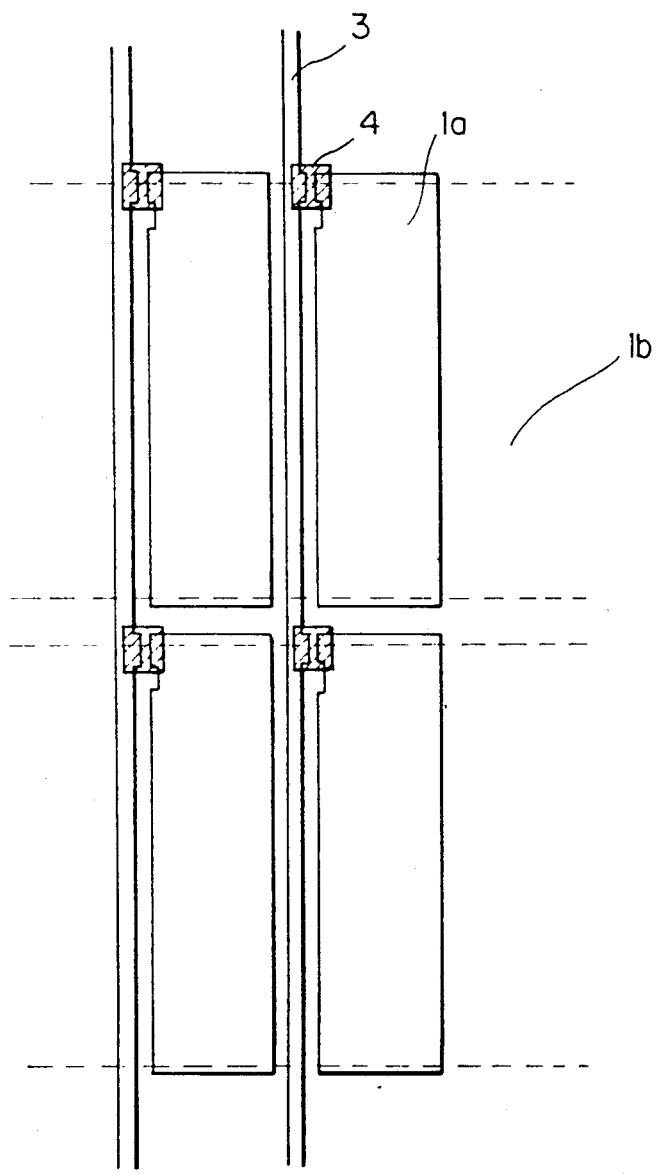
FIG. 1(B) shows a conventional arrangement of picture element electrodes, signal lines, varistor layers, and scanning electrodes.
Figure 1C:
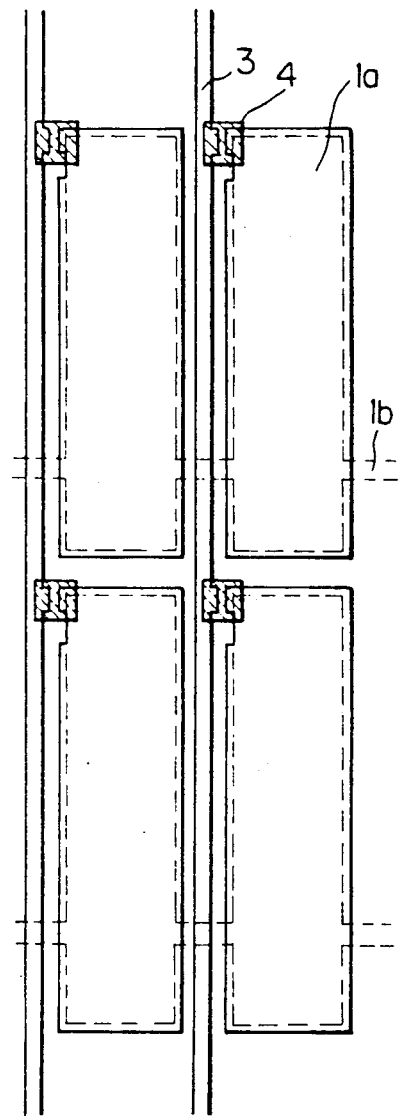
FIG. 1(C) shows another conventional arrangement of picture element electrodes, signal lines, varistor layers, and scanning electrodes.

In the LCD device shown FIG. 1(A), in the direction at a right angle from the first and second bases 2a and 2b, the varistor layers 4 at least partially face the corresponding scanning electrodes 1b through the liquid crystal material layer 5 as shown in FIG. 1(B) or 1(C). Therefore, when the liquid crystal material layer is thin, and thus the outer face of each varistor layer 4 is close to or in contact with the lower face of the corresponding scanning electrodes 1b and a voltage is applied to a signal line 3, an electric current flows from the signal line to a corresponding scanning electrode 1b through a corresponding varistor layer 4 or from a picture element electrode 1a to a corresponding scanning electrode 1b through a corresponding varistor layer 4. This phenomenon causes a reduction in the voltage between the picture element electrode 1a and the corresponding scanning electrode 1b and the brightness of the liquid crystal material layer is lowered.

This disadvantage becomes significant with a reduction in thickness of the liquid crystal material layer.

The above disadvantages can be eliminated by the liquid crystal display device of the present invention.

Figure 2:
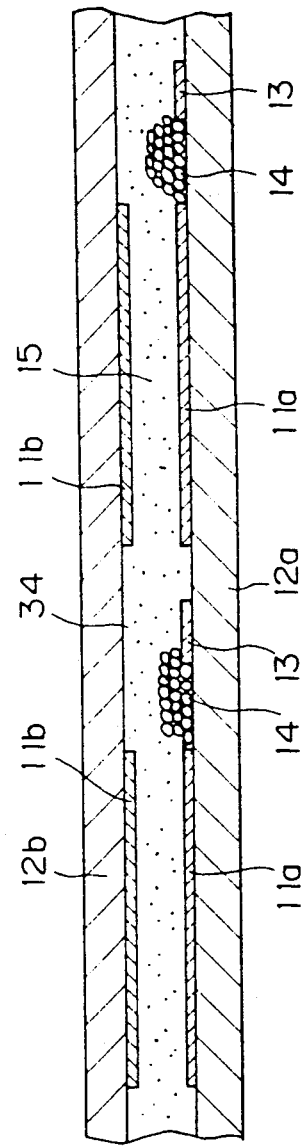
FIG. 2 is an explanatory cross-sectional view of an embodiment of the LCD device of the present invention.

FIG. 2 is an explanatory cross-sectional view of an embodiment of the liquid crystal display device of the present invention.

Referring to FIG. 2, a plurality of picture element electrodes 11a are arranged in a predetermined pattern on an upper surface of a first transparent glass base 12a; a plurality of signal lines 13 for supplying electric signals to the picture element electrodes 11a are arranged adjacent to the picture element electrodes 11a on the first base 12a; a plurality of non-linear elements each consisting of a varistor layer 14 are arranged between and connect the picture element electrodes 11a and the adjacent signal lines 13; a second transparent glass base 12b is arranged in parallel to and spaced from the first base 12a; a plurality of transparent scanning electrodes 11b are fixed to the lower surface of the second base 12b, and the space between the first base 12a and the second base 12b is filled by a liquid crystal material 15.

In the liquid crystal display device of the present invention, the scanning electrodes must have a size, shape and location satisfying a relationship to the varistor layers such that a plurality of vacant spaces 34 are formed between the scanning electrodes, and the varistor layers face the vacant spaces 34 but not the scanning electrodes 11b, in the direction at a right angle to the first and second surfaces.

This feature of the liquid crystal display device of the present invention very effectively prevents an undesirable flow of an electric current from a signal line to a corresponding scanning electrodes through a corresponding varistor layer, and thus even under a high voltage, a matrix circuit comprising the varistor layer and the liquid crystal material layer can be maintained in a normal condition, and clear images with a high brightness and a high contrast can be displayed.

Also, it is unnecessary to coat the electrodes with insulating layers, and thus the process of producing the LCD device becomes simple and easy and the resultant device can be operated under a low drive voltage.

Figure 3:
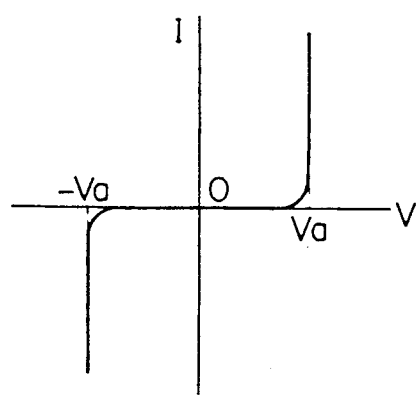
FIG. 3 shows a voltage-current curve of a varistor.

In the LCD device of the present invention, the varistor is usually used as a surge-absorbing element and exhibits a specific voltage-electric current property as shown in FIG. 3.

Referring to FIG. 3, the varistor exhibits a high resistance under a voltage having a value less than (Va), and substantially does not allow an electric current to flow therethrough. When the voltage reaches the value (Va), however, the varistor exhibits a significantly reduced resistance and allows the electric current to flow therethrough as shown in FIG. 3. The specific value of the voltage Va is referred to as a threshold value voltage (Vth). The varistor voltage and capacity can be easily controlled by controlling the distance between electrodes or the size of the varistor particles, and therefore, the varistor is usable in various fields; for example, as a protective material for electronic circuits and against lightning.

The varistor usable for the present invention is preferably in the form of a layer or film consisting of fine varistor particles. The layer of the fine varistor particles can be easily formed between the picture element electrodes and the adjacent signal lines by printing a paste comprising, as a main component, the fine varistor particles. This printing method is advantageous in that the operation for forming the varistor layer is simple and easy, in comparison with conventional varistor layer-forming methods, and a number of non-linear elements having a uniform quality can be provided at a low cost.

When a number of fine varistor particles having a substantially uniform size and a substantially spherical shape are used, the resultant varistor layer between the picture element electrodes and the signal lines exhibit a substantially uniform threshold value voltage (Vth) and the resultant LCD device can produce a satisfactory display.

The varistor particles preferably have a size of 1 to 30 $\mu$m, more preferably 2 to 20 $\mu$m. When the varistor particles are too large, the resultant varistor non-linear element has too large of a thickness, and such a thick element requires a thick polymer dispersed type liquid crystal layer, and therefore, an excessively high drive voltage. When the size of the varistor particles is too small, the distance between the picture element electrodes and the signal lines must be shortened, and this makes it difficult to form precise gaps between the picture element electrodes and the signal lines.

Figure 4A:
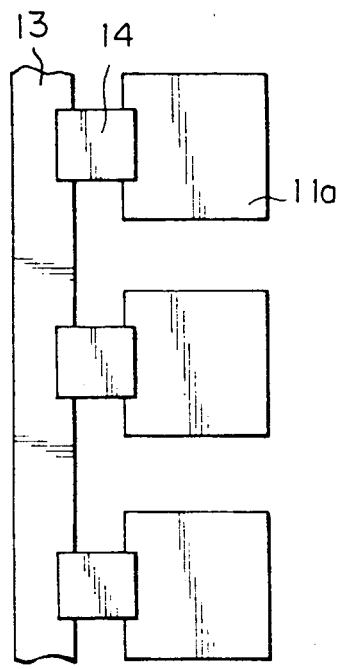
FIG. 4(A) shows an arrangement of picture element electrodes, signal lines and non-linear elements in the LCD device of the present invention.

Referring to FIG. 4A, a plurality of picture element electrodes 11a are separately connected to a signal line 13 through non-linear elements 14.

Figure 4B:
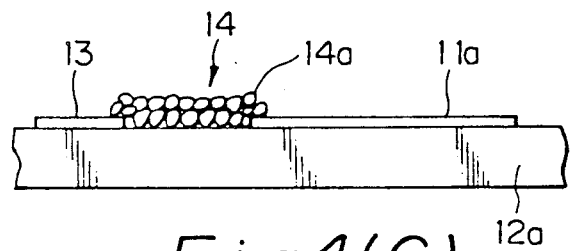
FIG. 4(B) shows a front view of a combination of a picture element electrode with a signal line and a non-linear element.
Figure 4C:
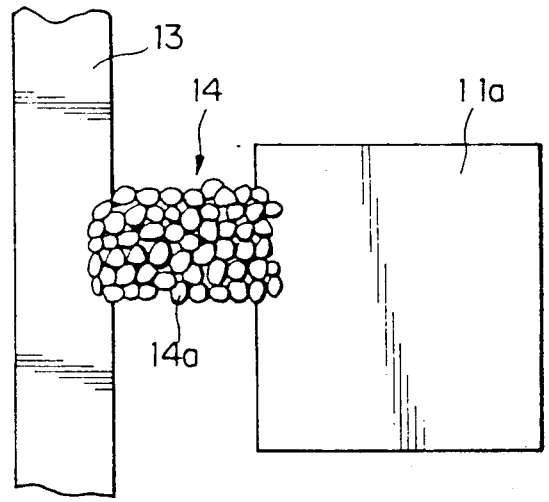
FIG. 4(C) is a plane view of the combination shown in FIG. 4(B)

Referring to FIGS. 4(B) and (4C), a picture element electrode 11a and a signal line 13 fixed to a first base 12a are connected to each other through a non-linear varistor layer 14 consisting of a number of varistor particles 14a.

Figure 5:
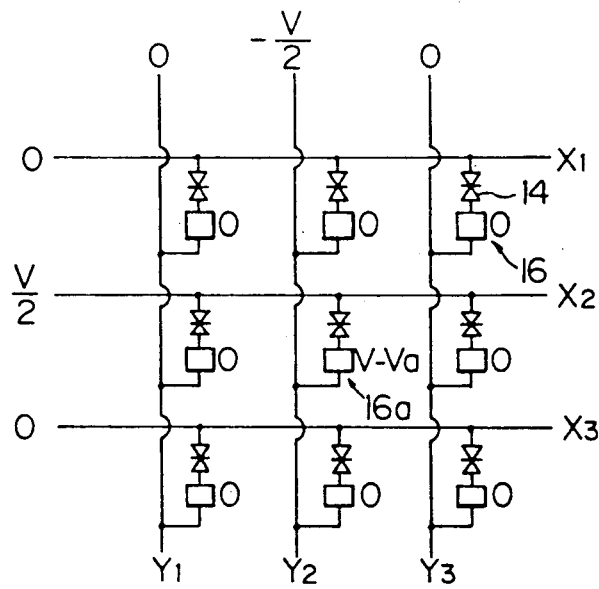
FIG. 5 shows a matrix circuit of the LCD device of the present invention.

Referring to FIG. 5, which shows a matrix circuit of the LCD device of the present invention, a plurality of LCD elements 16 comprising picture element electrodes 11a and corresponding LC material layers (not shown) are connected to signal lines $X_1, X_2, X_3 \ldots$ through varistor layer 14 and to signal lines $Y_1, Y_2, Y_3 \ldots$ crossing the signal lines $X_1, X_2, X_3 \ldots$. When voltages 0, V/2 (V/2<Vth<V) and 0 are applied, respectively, to the signal lines $X_1, X_2$ and $X_3$, and voltages 0, $-V/2$ and 0 are applied, respectively, to the signal lines $Y_1, Y_2$ and $Y_3$, the LCD element 16a connected to both signal lines $X_2$ and $Y_2$ allows an electric current to flow therethrough but none of the other liquid crystal display elements 16 allows an electric current to flow therethrough, because the varistor layer 14 exhibits a threshold voltage (Vth) which is higher than the voltage V/2 applied thereto; i.e., the varistor layer 14 hinders the flow of electric current therethrough under a voltage of V/2 or less.

In the LCD element 16a connected to the signal lines $X_2$ and $Y_2$, since Va<V, a voltage V—Va is applied to the element 16a, and thus undesirable cross talk between the element 16a and the other elements 16 can be prevented.

The voltage applied to the LCD element 16a connected to the signal lines $X_2$ and $Y_2$ can be maintained at a level lower than the varistor voltage, and thus the LCD element 16a can be maintained in the display state even when the voltage applied to the signal lines $X_2$ and $Y_2$ is varied, because the electric charge is held by the varistor layer.

The varistor layer or film can be produced by the following procedures.

Zinc oxide powder is molded into pellets under a pressure of 50 to 500 kg/cm² and sintered at a temperature of 700° C. to 1300° C., the sintered pellets are pulverized to provide zinc oxide fine particles having a size of 1 to 30 μm, preferably 2 to 20 μm, and the fine particles are further sintered at a temperature of 800° C. to 1300° C. to produce spherical particles.

The sintered spherical zinc oxide particles are doped with at least one member selected from $Bi_2O_3$, $Co_2O_3$, $MnO_2$, and $Sb_2O_3$ at a temperature of 700° C. to 1300° C., and the resultant varistor particles preferably have a size of 0.1 to 100 μm, more preferably 1 to 20 μm. If the size of the varistor particles is too large, the resultant non-linear elements have an excessively large thickness and thus require an excessively high drive voltage. If the size of the varistor particles is too small, the gaps between the picture element electrodes and the signal lines must be made narrower, and it is very difficult to control the formation of such small gaps with a high accuracy.

Preferably, the varistor particles are spherical and have an even size, as such varistor particles will form a non-linear element having a uniform threshold value voltage, and thus the resultant LCD device will display a clear picture.

The varistor layer bridges the picture element electrode and the signal line but does not completely cover the picture element electrode, and therefore, the LCD device of the present invention having the varistor layer can be used as a light transmission type device.

The resultant varistor particles are mixed with a bonding material consisting of, for example, glass particles and/or an organic binder in an amount of 5% to 200% based on the weight of the varistor, to provide a printable varistor paste.

The organic binder is selected from evaporation-drying type binders which can be solidified by drying and hardening type binders which can be solidified by curing.

The evaporation-drying type binders include cellulosic materials such as methyl cellulose, ethyl cellulose, cellulose triacetate, polyacrylic resins, for example, polymethyl methacrylate, vinyl acetate polymer and copolymer, and polyvinyl alcohol. The binder may contain a small amount of a solvent or plasticizer.

The hardening binder may be selected from room temperature-hardening binders, for example, epoxy binders (for example, DP-pure 60, made by 3M) and silicone binders (for example, TSE 352, made by Toshiba Silicone); thermal-hardening binders, for example, epoxy binders (for example, JA-7434, made by 3M), and silicone binders (for example, Epoxy TSJ, 3155) which are heat-hardening type binders; photohardening monomers, for example, 2-ethylhexyl acrylate and dicyclopentenyl acrylate; photohardening prepolymers, for example, polyesteracrylate, epoxyacrylate, and mixtures of the above-mentioned substances. Preferably, the photohardening type binders containing a monomer and/or a prepolymer are used for the present invention, and further, radiation-hardening or electronic ray hardening binders are used for the present invention.

The varistor paste is applied, by a printing method, to a first base having a plurality of picture element electrodes and signal lines, to form a bridge therebetween of a film of the paste, and the paste film is solidified and heat-treated at a temperature of 300° C. to 500° C., when glass particles are used as a binder, to form a varistor layer or film.

It is known that the first base can be made of polycrystalline ZnO and used as a varistor to provide nonlinear elements. This type of first base, however, is not transparent, and thus cannot be used for a transparent display device. The nonlinear elements consisting of varistor particles can be utilized for the transparent display device.

The LCD device of the present invention has a liquid crystal material layer arranged between the picture element electrodes fixed on the first base and the scanning electrodes fixed on the second base.

The liquid crystal material preferably comprises liquid crystals responsive to the presence of an electric field to increase an optical transmission, and surface means for affecting the natural structure of the liquid crystals to induce a distorted alignment thereof in the absence of the electric field to reduce an optical transmission regardless of the polarization.

This type of liquid crystal material includes liquid crystals dispersed in a matrix consisting essentially of a polymeric material and liquid crystals filled in networkshaped continuous pores formed in a matrix consisting essentially of a polymeric material.

The liquid crystals dispersed in the polymeric matrix include Nematic Curvilinear Aligned phase (NCAP) type liquid crystals materials in which liquid crystals are dispersed in the form of fine spheres independently from each other in a polymeric matrix; liquid crystals dispersed and contained in a thermoplastic resin and liquid crystals dispersed in an epoxy resin. The liquid crystals usable for the present invention may be nematic liquid crystals or smectic liquid crystals.

The polymeric material usable as a matrix of the liquid crystal material is preferably selected from polystyrene, polyvinyl chloride, polyvinyl alcohol, polycarbonate, polybutadiene rubber, polymethylmethacrylate, polybutylmethacrylate, polyvinylpyrrolidone, ethyl cellulose, cyanoethyl cellulose, polyvinylidene fluoride, nitrile rubber (NBR) and polysulfide rubber (thiocobol).

In the LCD device of the present invention, the liquid crystal material is preferably the NCAP type liquid crystal material used in combination with the varistor layer.

The polymer dispersed type liquid crystal material is disclosed in PCT International Publication No. 83/01016, U.S. Pat. No. 4,435,047 and "Electronic Parts and Materials" No. 12,1987, pages 67 to 70. In the polymer dispersed type liquid crystal material, a liquid crystal material having a positive dielectric anisotropy is surrounded by a transparent surface means or matrix for affecting the natural structure of the liquid crystal material, to induce a distorted alignment thereof in the absence of an electric field and thus reduce the optical transmission regardless of the polarization. The liquid crystal material is responsive to the presence of an electric field, to increase the amount of optical transmission.

In the polymer dispersed type liquid crystal material, the above-mentioned surface means or matrix usually contains discrete amounts of the liquid crystal material dispersed therein, for example, in the form of capsules. Usually, the surface means comprises a transparent organic polymeric material having a dielectric constant that is nearly equal to the lower dielectric constant value of the liquid crystal material.

The transparent organic polymeric material may comprise a thermoplastic polymer material, for example, a polyester resin, or a thermosetting polymeric material, for example, an epoxy resin.

Figure 6A:
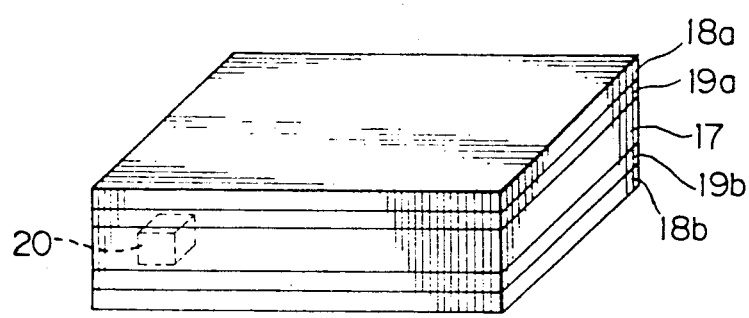
FIG. 6(A) shows an explanatory schematic view of a polymer-dispersed type LCD device.
Figure 6B:
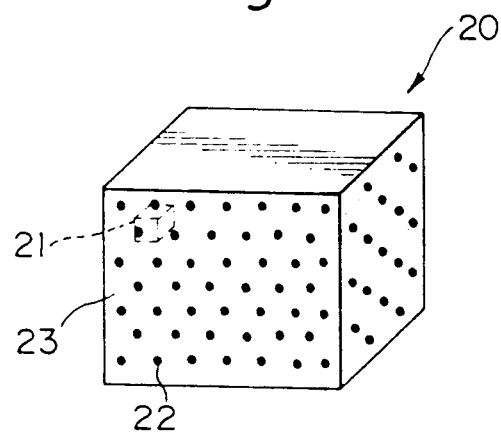
FIG. 6(B) shows an explanatory schematic view of a polymer-dispersed type LCD.
Figure 6C:
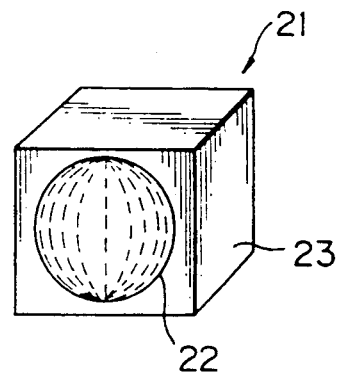
FIG. 6(C) shows an explanatory schematic view of a liquid crystal capsule.

An embodiment of the polymer-dispersed type LCD device is shown in FIGS. 6(A), 6(B) and 6(C).

Referring to FIG. 6(A), a polymer-dispersed type liquid crystal material layer 17 is arranged between an upper resinous film 18a and a lower resinous film 18b. The resinous films 18a and 18b are coated with transparent electroconductive electrode layers 19a and 19b comprising ITO.

Referring to FIG. 6(B), which shows a portion 20 of the polymer-dispersed type liquid crystal layer 17 shown in FIG. 6(A), in the portion 20 of the polymer-dispersed type liquid crystal layer 17, a number of fine particles 22 of the liquid crystal material are dispersed in a transparent matrix 23.

Referring to FIG. 6(C), in a small portion 21 of the liquid crystal material layer 17, a spherical particle 22 in a matrix 23 consists of a discrete amount of the liquid crystal material.

Figure 7A:
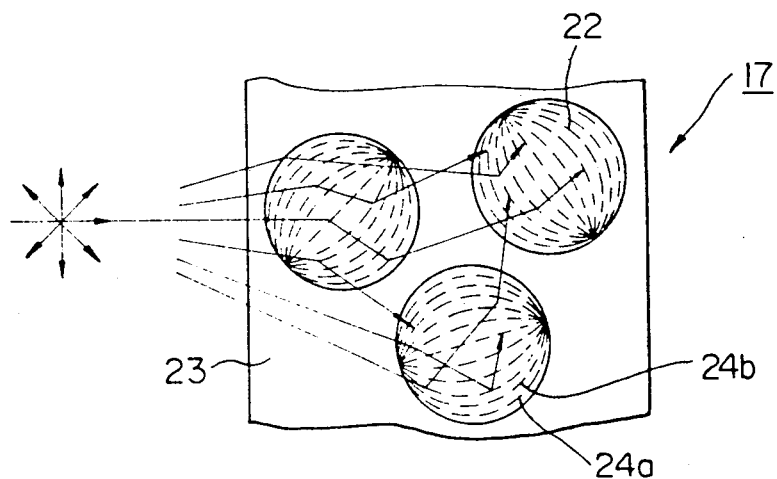
FIG. 7(A) shows a transmission of light applied to a polymer-dispersed type LCD in a state in which an electric field is not applied.
Figure 7B:
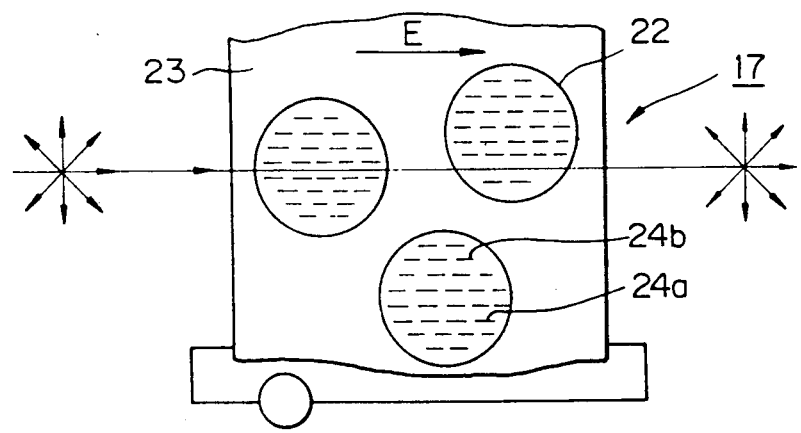
FIG. 7(B) shows a transmission of light through the polymer-dispersed type LCD layer in the state in which an electric field is applied.

FIGS. 7(A) and 7(B) show the behaviors of the polymer-dispersed type liquid crystal material in the absence and in the presence of an electric field. In the particles, the liquid crystal material contains pleochroic dyes.

In FIG. 7(A), in the absence of an electric field, a number of liquid crystal molecules 24a are aligned along the internal surfaces of the capsules. When a visible light is introduced into the liquid crystal material particle 22 through the transparent matrix 23 in the liquid crystal material layer 17, the incident light is scattered on the outside surface of the particles 22 and in the inside of the particles 22 due to the birefringence of the liquid crystal molecule 24a, and absorbed by the pleochroic dye molecules 24b, and accordingly, the liquid crystal material layer 17 has a dark (black or opaque) appearance.

In FIG. 7(B), when an electric field is applied to the liquid crystal material layer 17, the liquid crystal molecules 24a are aligned in the direction E of the electric field. When the normal refractive index of the liquid crystal molecules is almost equal to that of the matrix, the light can pass straight through the liquid crystal material layer 17 without scattering and thus the liquid crystal material layer 17 has a bright appearance. The degree of transparency of the liquid crystal material layer can be successively varied from a dark (black or opaque) condition to a bright (transparent) condition by varying the intensity of the electric field applied to the liquid crystal material layer.

The varistor layer usable for the present invention can be prepared, for example, by the following method.

Particles of ZnO are sintered at a high temperature of from 700° C. to 1300° C. and milled and screened, sintered ZnO particles preferably having a size of 1 to 30 $\mu$m, more preferably 2 to 20 $\mu$m are collected, and further, preferably sintered at a temperature of, for example, from 800° C. to 1300° C. to give the particles a spherical shape.

The sintered ZnO particles are usually doped with at least one member selected from, for example, $Bi_2O_3$, $Co_2O_3$, $MnO_2$, and $Sb_2O_3$, preferably in an amount of 0.1% to 10% based on the weight of the ZnO particles, and the resultant ZnO varistor particles are mixed with a binding material.

The binding material usually comprises a glass powder having a particle size of 0.1 to 20 $\mu$m, and/or the resinous binder such as ethyl cellulose, polyol acrylate resins, polyester resins, epoxy acrylate resins, hexanediol acrylate resins, and polyvinyl acetate. Usually, the glass powder is used in the amount of 5 to 200% based on the weight of the varistor particles, and the binder is preferably used in an amount of 2 to 100% based on the weight of the varistor particles.

The varistor particle-containing paste is applied in accordance with a predetermined pattern on a base, to form a bridge between the picture element electrodes made from ITO (indium tin oxide) and the corresponding signal lines, by a screen printing method, and the printed varistor paste layers are heat-treated at a temperature of 300° C. to 500° C. to form varistor membranes. Usually, the gaps between the picture element electrodes and the corresponding signal lines are from 10 to 200 $\mu$m, for example, about 50 $\mu$m.

In the LCD device of the present invention, the first transparent base usually comprises a glass plate having a thickness of 0.5 to 2 mm, and the second transparent base usually comprises a glass plate or a transparent plastic film, for example, polyethylene terephthalate film, having a thickness of 50 to 200 $\mu$m.

The picture element electrodes and the scanning electrode usually comprise ITO (indium tin oxide), and have a thickness of 0.05 to 1 $\mu$m.

The signal lines are usually made from ITO or metallic chromium and have a thickness of 0.01 to 1 $\mu$m.

The polymer-dispersed type liquid crystal material can be prepared in accordance with the method described in PCT International Publication No. WO 83/01016 and U.S. Pat. No. 4,435,047.

The polymer-dispersed type liquid crystal material layer usually has a thickness of 10 to 30 $\mu$m.

Figure 8:
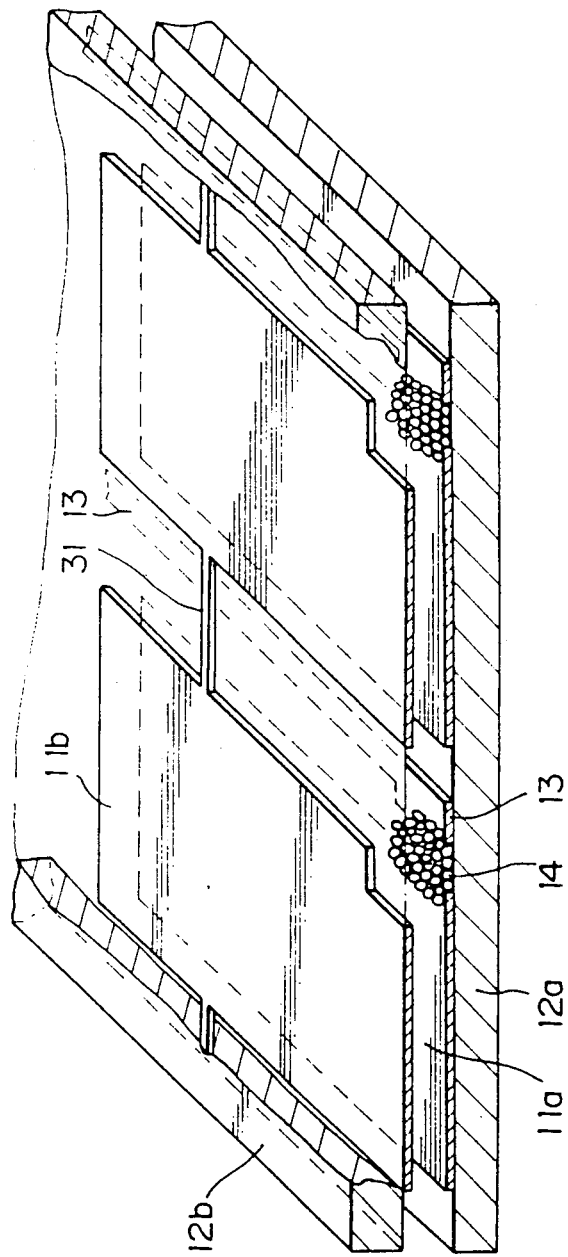
FIG. 8 shows an embodiment of the LCD device of the present invention in which each scanning electrode has a cut corner portion.

FIG. 8 shows an embodiment of the liquid crystal display device of the present invention.

Referring to FIG. 8, each picture element electrode 11a on a first base 12a is electrically connected to a signal line 13 through a varistor layer 14. Usually, the picture element electrode 11a is spaced by 10 to 400 μm from the corresponding signal line 13.

On a second base 12b, a plurality of scanning electrodes 11b are fixed in a relationship in which they are almost facing the picture element electrodes 11a, and are connected to each other by bridges to form, together with the picture element electrodes, a matrix drive circuit.

The scanning electrode 11b is in the form of a polygonal plate, for example, a rectangular plate, in which a corner portion thereof closest to a varistor layer 14 is cut to form a vacant space, and the varistor layer 14 faces at least a portion of the vacant space but does not face the scanning electrode 11b per se in the direction at a right angle from the first and second base surfaces.

Figure 9:
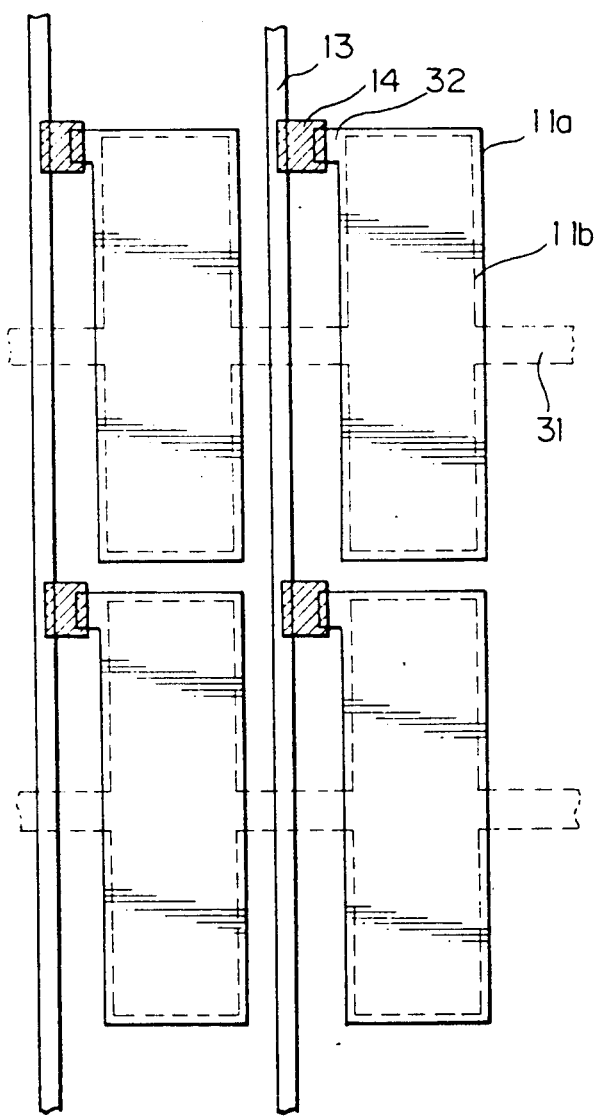
FIG. 9 shows another embodiment of scanning electrodes each having a protrusion protruding toward a signal line.

Referring to FIG. 9 showing another embodiment of the LCD device of the present invention, each picture element electrode 11a has a protrusion 32 protruding toward the signal line 13. The signal line 13 is connected to the protrusion 32 of the picture element electrode 11a through a varistor layer 14.

Each scanning electrode 11b has a shape, size and location suitable for facing only a portion of the corresponding picture element electrode 11a exclusive from the protrusion 32, and thus does not face the varistor layer 14.

In still another embodiment of the LCD device of the present invention, the scanning electrodes are spaced from each other through gaps so as to cause each varistor layer to face at least a portion of each gap as shown in, for example, FIG. 9. This embodiment will be further explained hereinafter.

Usually, the distance between the first and second bases is from 5 to 50 μm.

Also, in the LCD device of the present invention, a scanning operation can be carried out on the scanning electrodes on the second base or on the signal lines on the first base.

In an embodiment of the LCD device of the present invention, the signal lines have branches thereof extending between two adjacent picture element electrodes, and the varistor layers are formed on the branches so as to connect the signal line branches to two adjacent picture element electrodes.

Figure 10:
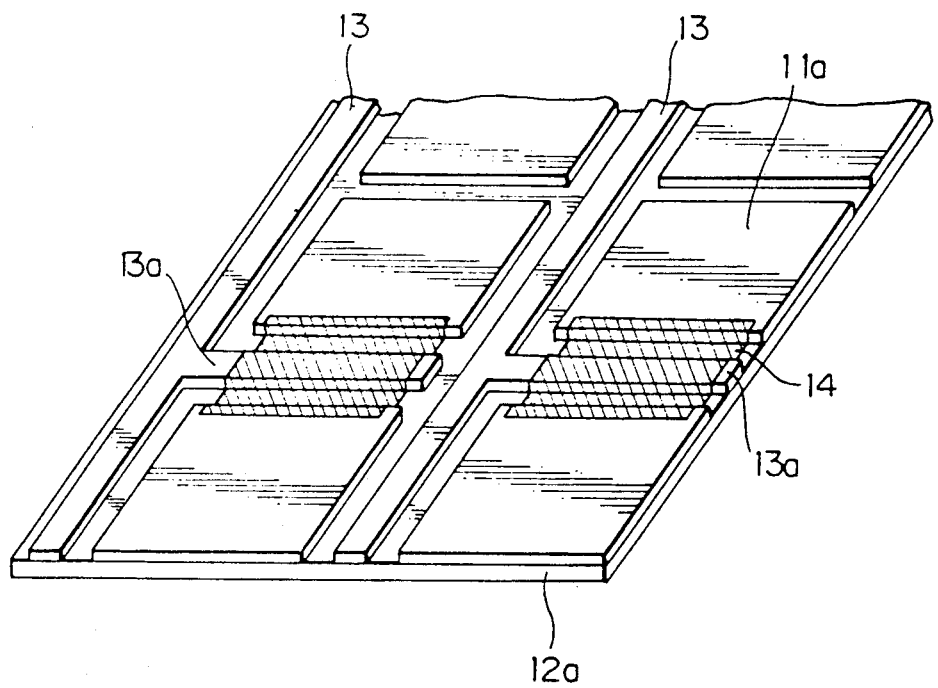
FIG. 10 shows an example of the arrangement of the signal lines, picture element electrodes, and varistor layers.

Referring to FIG. 10, a plurality of picture element electrodes 11a are arranged on a first base 12a and are spaced from each other. Also, a plurality of signal lines 13 are arranged adjacent to and spaced from the picture element electrodes 11a. The signal lines 13 have branches 13a extending between the adjacent two picture element electrodes 11a.

Each signal line branch 13a is connected to two adjacent picture element electrodes 11a through a varistor layer 14.

The varistor layer 14 preferably covers the side edge portions (for example, transverse side edge portions) of each picture element electrode for 50% or more of the length of the side edge portion, as indicated in FIG. 10.

Figure 11:
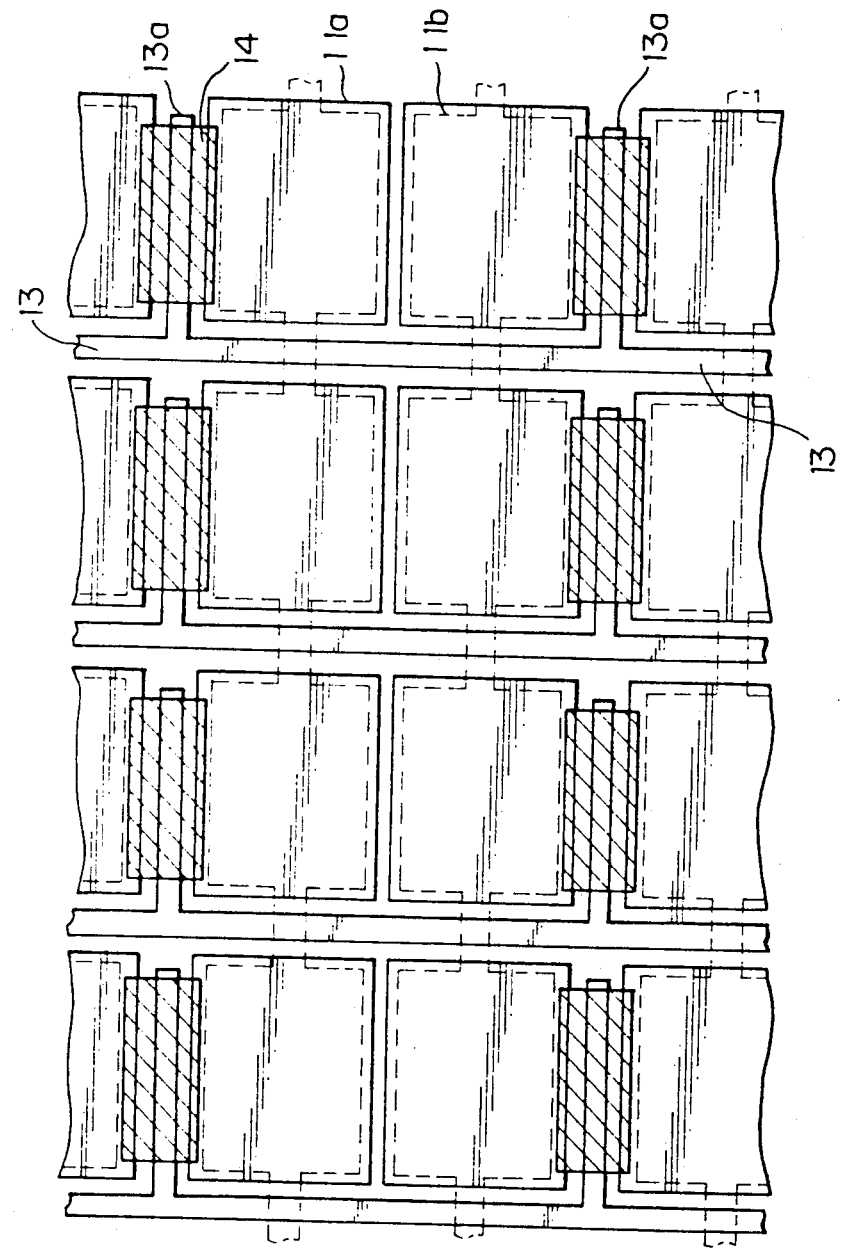
FIG. 11 shows an example of the arrangement of scanning electrodes, picture element electrodes, signal lines, and varistor layers.

In FIG. 11, a plurality of scanning electrodes 11b on a second base (not shown) are spaced from each other through gaps and each varistor layer 14 on a first base (not shown) faces the gaps, to prevent an undesirable reduction of brightness.

Figure 12:
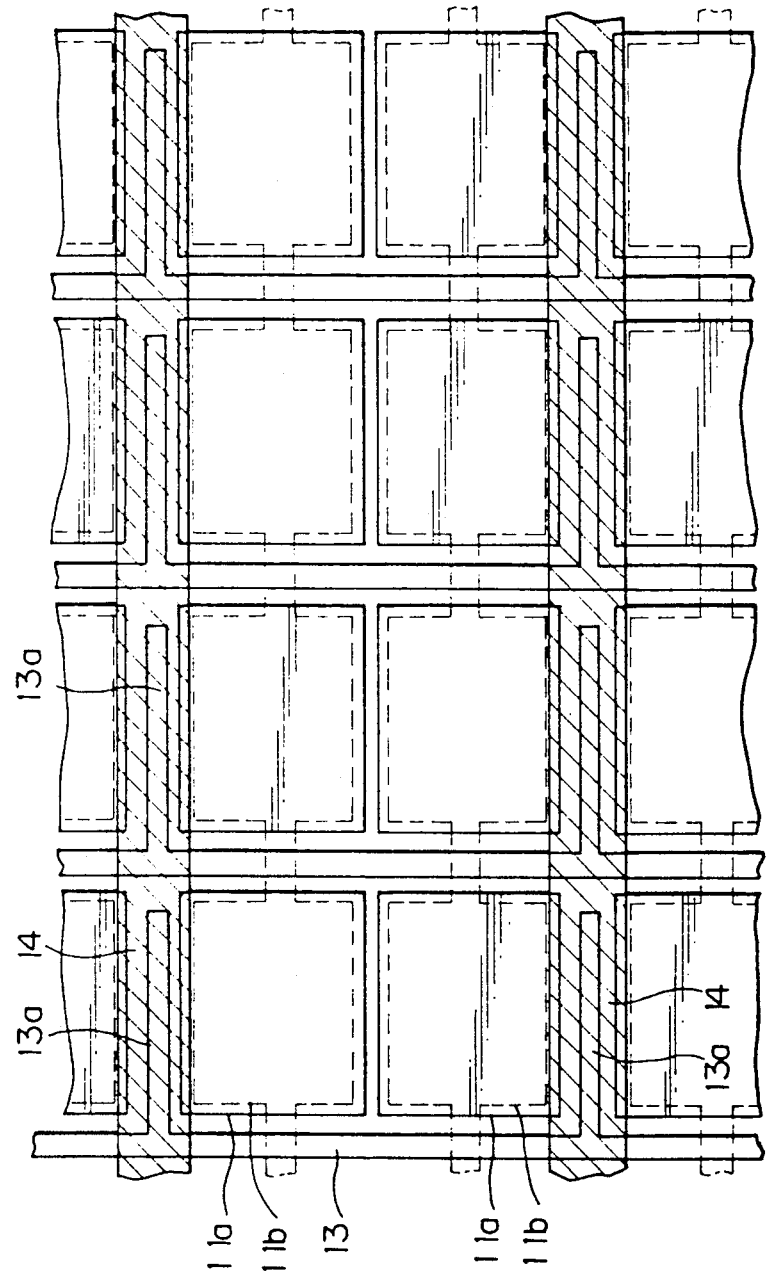
FIG. 12 shows another example of the arrangement of the scanning electrodes, picture element electrodes, signal lines, and varistor layers.

Referring to FIG. 12, a plurality of signal line branches 13a are connected to adjacent picture element electrodes 11a through a common varistor layer 14. The common varistor layers 14 face common gaps formed between two rows of scanning electrodes 11b.

Figure 13:
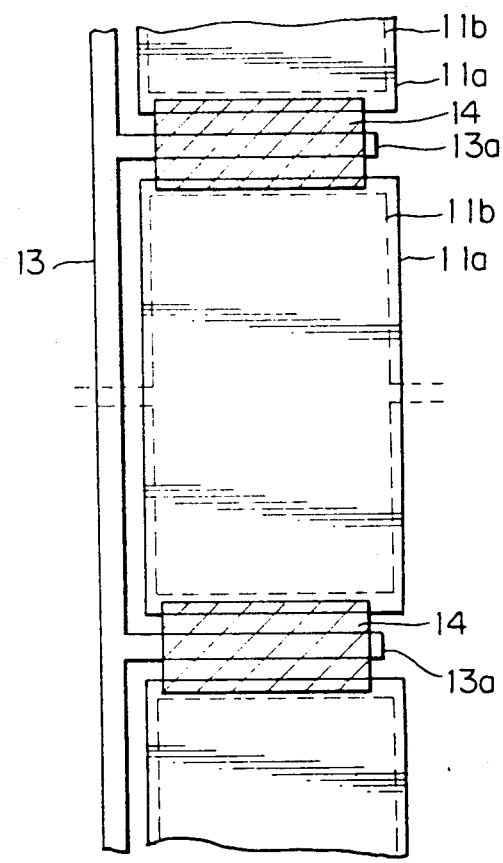
FIG. 13 shows still another example of the arrangement of the scanning electrodes, picture element electrodes, signal lines, and varistor layers.

Referring to FIG. 13, two side edges of each picture element electrode are connected to corresponding signal line branches 13a through a varistor layer 14. Also, each varistor layer 14 faces a gap between two adjacent scanning electrodes 11b.

Figure 14:
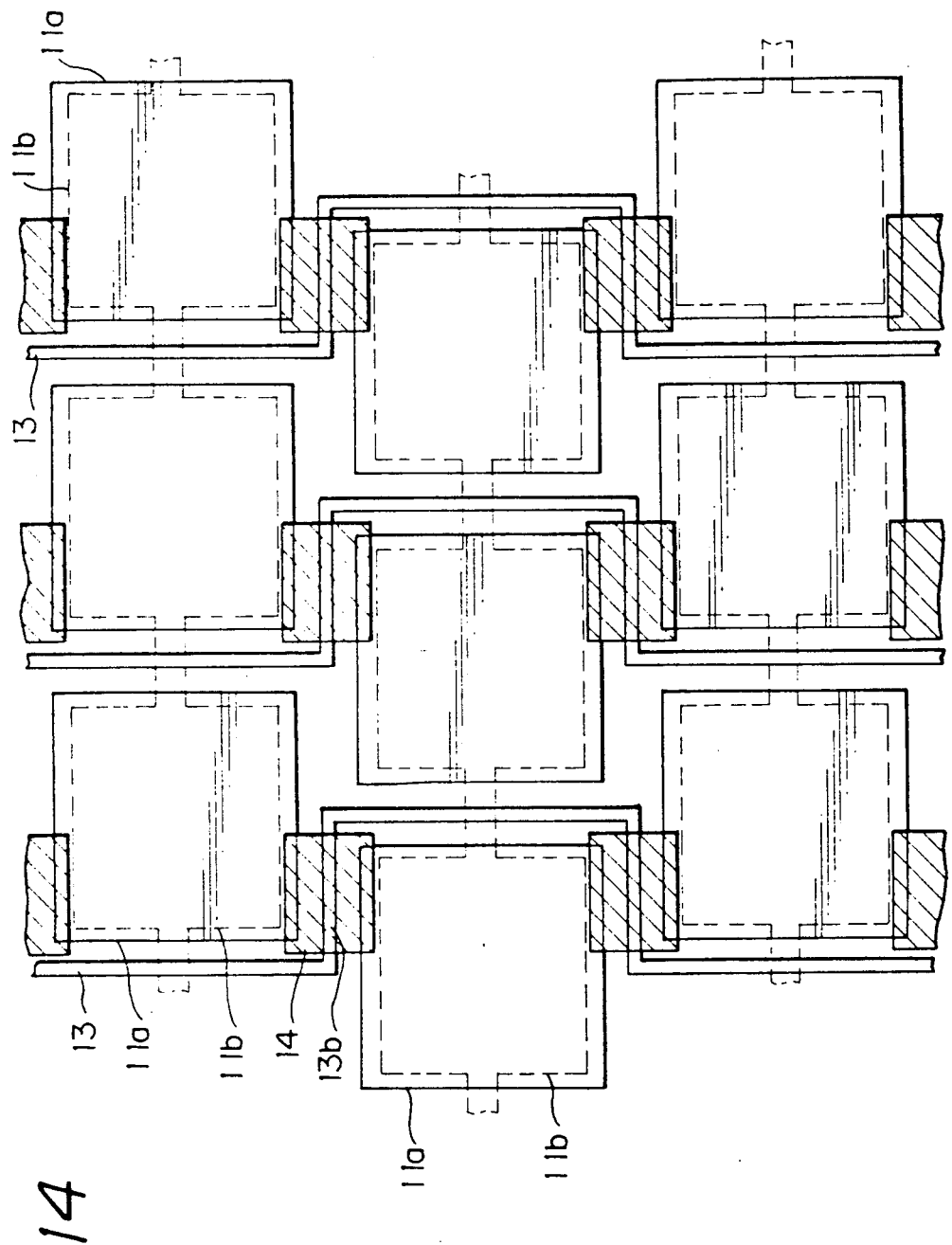
FIG. 14 shows another example of the arrangement of the scanning electrodes, picture element electrodes, signal lines, and varistor layers.

Referring to FIG. 14, a plurality of picture element electrodes 11a are arranged in a zigzag pattern, for example, in each longitudinal row as shown in the drawing, the signal lines are arranged in a zig-zag form among the longitudinal rows of the picture element electrodes 11a, and in each longitudinal row, corner portions of the picture element electrodes facing each other through bent portions 13b of the signal lines 13 are connected to the bent portions 13b of the signal lines 13 through the varistor layer 14.

The varistor layers 14 are arranged between two adjacent transverse rows of picture element electrodes 11a and face the gaps between two adjacent transverse rows of scanning electrodes 11b, so that the scanning electrodes 11b do not face the varistor layers 14.

Figure 15:
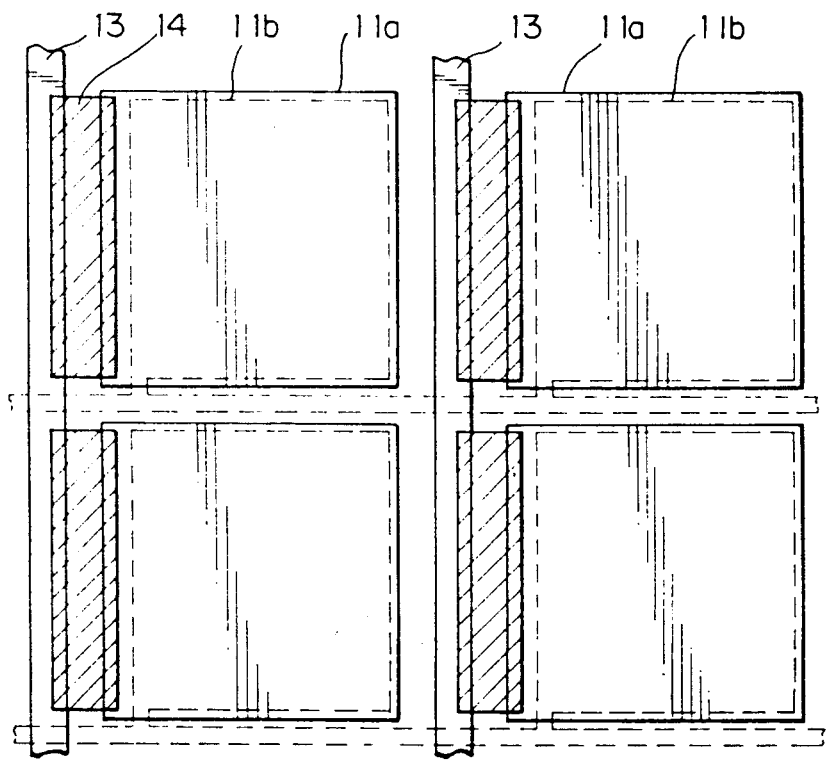
FIG. 15 shows still another example of the arrangement of the scanning electrodes, picture element electrodes, signal lines, and varistor layers.

In FIG. 15, a longitudinal side edge portion of each picture element electrode 11a is directly connected to a signal line 13 through a varistor layer 14. Each scanning electrode is arranged so that it does not face the varistor layers 14.

In another embodiment of the LCD device of the present invention, the liquid crystal material layer has vacant spaces to which the varistor layers are exposed without coming into contact with the liquid crystal material.

This embodiment is useful for a LCD device having a thin liquid crystal material layer.

Figure 16:
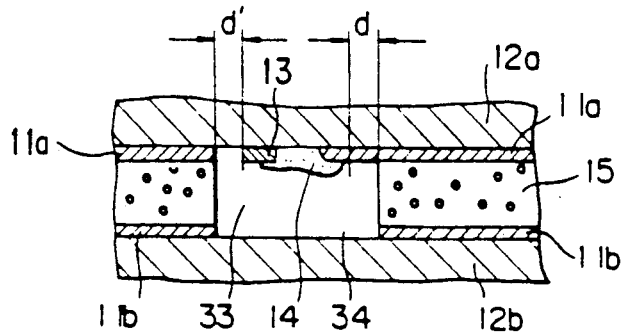
FIG. 16 shows a cross-sectional view of another embodiment of the LCD device of the present invention.

Referring to FIG. 16, the liquid crystal material layer 15 has a vacant space 33 in the form of a vertical column or aperture extending in the direction at a right angle to the first and second bases 12a and 12b, and a varistor layer 14 fixed on the first base 12a is exposed to the vacant space 33 and thus does not come into contact with the liquid crystal material.

The varistor layer 14 is connected to a picture element electrode 11a. In FIG. 16, the rightmost end of the varistor layer 14 is spaced by a distance d from the right wall face of the vacant space 33 and the leftmost end of the varistor layer 14 is spaced by a distance d' from the left wall face of the vacant space 33.

Also, the varistor layer 14 does not face the scanning electrode 11b formed on the second base 12b, but faces a groove 34 formed between two adjacent scanning electrodes 11b.

Figure 17:
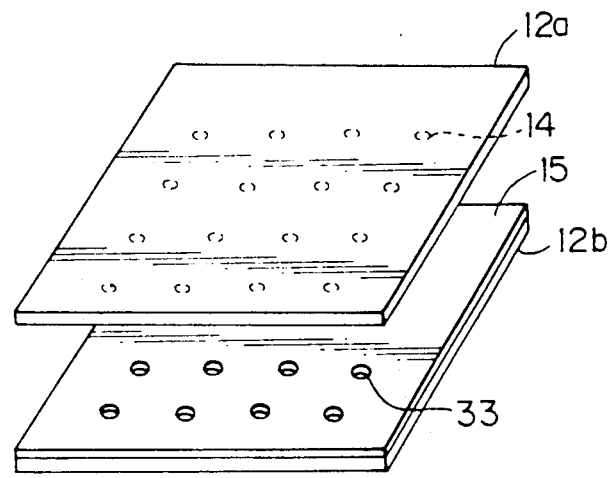
FIG. 17 is an explanatory view of an upper part and a lower part of another embodiment of the LCD device of the present invention, before assembly of these parts.

Referring to FIG. 17, a plurality of varistor layers 14 are fixed on the lower face of a first base 12a, and a liquid crystal material layer 15 is formed on an upper face of a second base 12b and is provided with a plurality of column-shaped vacant spaces or apertures 33 separate from each other. The cross-sectional area of the apertures 33 is slightly larger than the cross-sectional area of the varistor layers 14.

The first base 12a having the varistor layers 14 is bonded to the second base 12b having the liquid crystal material layer 15, in a manner such that each varistor layer 14 is contained in the corresponding aperture 33 without coming into contact with the liquid crystal material.

The vacant spaces 33 in the liquid crystal material layer 15 can be formed by boring, in predetermined dimensions, a liquid crystal material layer 15 formed on the second base 12b. Otherwise, a negative mask is placed on a second base 12b, a liquid crystal material layer is formed and solidified on the negative mask, and then the negative mask is removed from the resultant liquid crystal material layer.

Figure 18A:
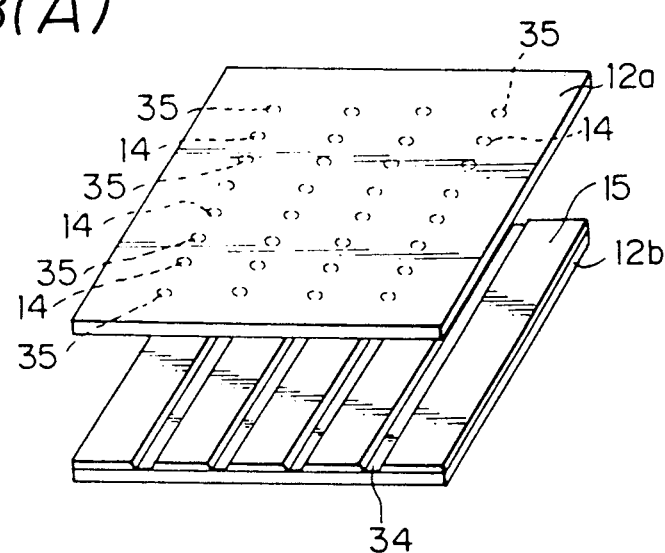
FIG. 18(A) is an explanatory view of an upper part and a lower part of another embodiment of the LCD device of the present invention, before assembly of these parts.

In FIG. 18(A), a plurality of liquid crystal material layers 15 separate from each other are formed as stripes on a second base 12b. The liquid crystal material layers 15 are spaced from each other through separate grooves 34.

Separately, a plurality of varistor layers 14 and adhesive layers 35 having a smaller width than that of the grooves 34 are formed alternately on a first base 12a.

Figure 18B:
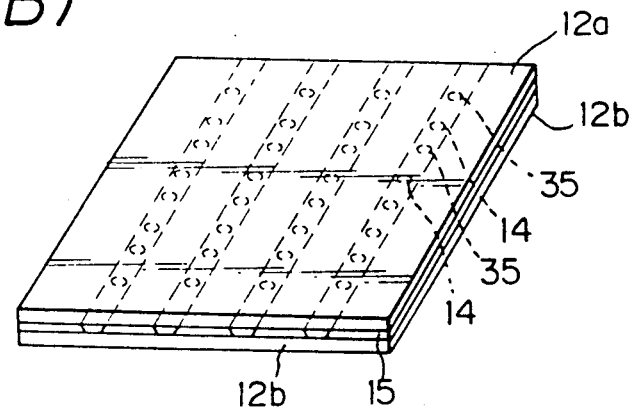
FIG. 18(B) is an explanatory view of the embodiment of the LCD device as shown in FIG. 18(B) after assembly of these parts.

In FIG. 18(B), the first base 12b is bonded to the second base 12a in a manner such that the varistor layers 12a are contained in the separate grooves 34 without coming into contact with the liquid crystal material layer 15 and the adhesive layers 35 come into contact with the bottoms of the grooves 34. By solidifying the adhesive layers 35, the first and second bases are bonded through the adhesive layers 35.

The stripe-shaped liquid crystal material layers 15 can be formed along the scanning lines or the signal lines.

The above-mentioned type of liquid crystal material layers can be provided on a second base by forming and solidifying a continuous liquid crystal material layer, and a plurality of stripe-shaped grooves are formed by cutting in accordance with a predetermined pattern. Alternatively, a mask having a negative pattern is placed on a second base, a liquid crystal material is fed onto the negative mask and solidified, and then the mask is removed from the resultant liquid crystal material layers.

Figure 19A:
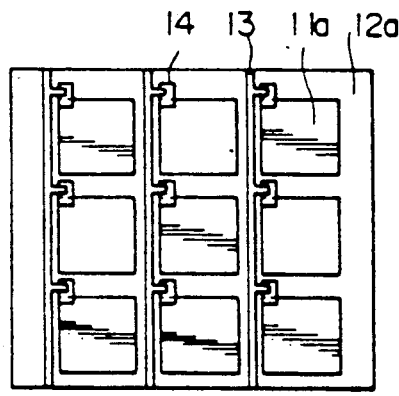
FIG. 19(A) shows an arrangement of the signal lines, picture element electrodes, and varistor layers.
Figure 19B:
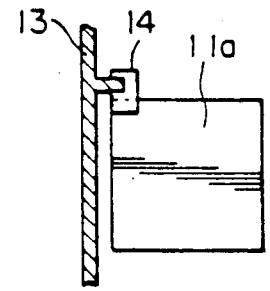
FIG. 19(B) shows one combination of the signal line, picture element electrode, and varistor layer, as shown in FIG. 19(A)

In FIG. 19(A) and 19(B), a plurality of picture element electrodes 11a and a plurality of signal lines 13 are formed on a first base 12a, and each picture element electrode 11a is connected to a corresponding signal line 13 through a varistor layer 14.

For example, the signal lines 13 are formed from a transparent electrode material and the varistor layers 14 are formed in a length and width of 0.5 mm and a thickness of 13 μm by a printing operation and exhibit a varistor voltage of 40 V ± 3 V.

Figure 19C:
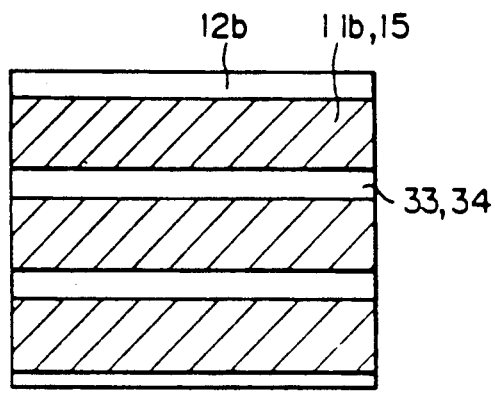
FIG. 19(C) shows an arrangement of the scanning electrodes and liquid crystal layers on a second base.
Figure 19D:
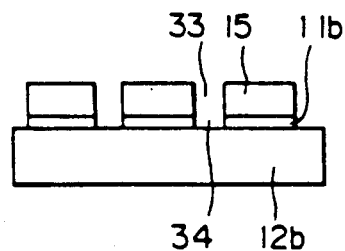
FIG. 19(D) shows a side view of the arranged scanning electrodes and liquid crystal layers on the second base as shown in FIG. 19(C)

Referring to FIGS. 19(C) and 19(D), a surface of a second base 12b is coated with strip-patterned layers of a scanning electrode-forming material and then with a single continuous layer of a polymer-dispersed type liquid crystal material.

The resultant laminated liquid crystal material layer is cut in accordance with the predetermined pattern of the scanning electrodes to provide a plurality of scanning electrodes 11b and a plurality of liquid crystal material layers 15 laminated on the scanning electrodes 11b, and to form a plurality of grooves 34 between the above-mentioned laminated layers.

For example, the emulsion comprises 5 g of liquid crystals, 20 g of a 10% polyvinyl alcohol aqueous solution and 0.2 g of pleochroic black dyes and forms a liquid crystal material layer having a thickness of 15 μm, and the grooves 34 have a width of 0.8 mm.

The first base 12a having the picture element electrodes 11a, signal lines 13 and varistor layers 14 is bonded to the second base 12 having the laminated scanning electrodes 11b and liquid crystal material layers 15 in a manner such that the varistor layers 14 are contained in the grooves 34 without coming into contact with the liquid crystal material layer, the scanning electrodes 11b, and the second base 12b. The varistor layers 14 may be coated with a thin layer of the liquid crystal material.

The side edge surfaces of the resultant laminate, namely an LCD device, are sealed by applying an adhesive agent.

In still another embodiment of the LCD device of the present invention, the second base has concavities connected or continued to the vacant spaces between the scanning electrodes and then to the vacant spaces in the liquid crystal material layer.

In a further embodiment of the LCD device of the present invention, the second base has openings connected or continued to the vacant spaces between the scanning electrodes and then to the vacant spaces in the liquid crystal material layer.

Those embodiments are useful for an LCD device having a very thin liquid crystal material layer in comparison with the thickness of the varistor layers.

Figure 20:
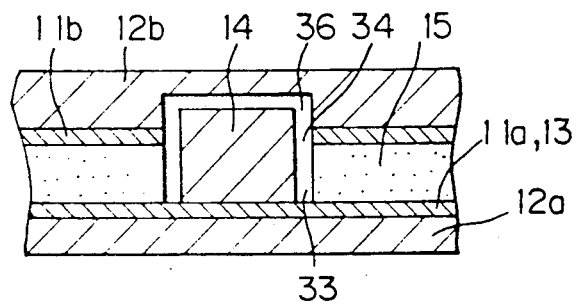
FIG. 20 shows an explanatory cross-section of another embodiment of the LCD device of the present invention.
Figure 21:
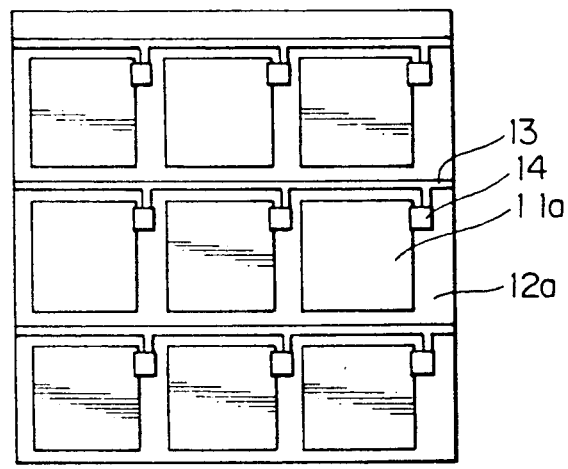
FIG. 21 shows another arrangement of the signal lines, picture element electrodes, and varistor layers.

Referring to FIG. 20, which shows an explanatory cross-section of an embodiment of the LCD device of the present invention, and to FIG. 21 which shows an arrangement and connections of various elements on a first base used in the LCD device shown in FIG. 20, a plurality of picture element electrodes 11a and signal lines 13 are arranged on a first base 12a and connected to each other through varistor layers 14. Usually the distance between each picture element electrode 11a and the corresponding signal line 13 is 10 to 400 μm. A plurality of scanning electrodes 11b spaced from each other through grooves 34 are arranged on a second base 12b so as to face the picture element electrodes 11a through the liquid crystal material layer 15, and form a matrix drive circuit together with the picture element electrodes 11a. Usually, the thickness of the liquid crystal material layer 15 is 5 to 50 μm.

In FIG. 20, the scanning electrodes 11b are spaced from each other through vacant spaces 34, the liquid crystal material layer 15 has a plurality of vacant spaces 33, and the second base 12b has a plurality of concavities 36 connected to the vacant spaces 34 between the scanning electrodes 11b and the vacant spaces 33 in the liquid crystal material layer 15. The connected vacant spaces 33, 34 and concavities 36 contain the varistor layers 14 therein, as shown in FIG. 20. The varistor layers 14 are spaced from the second base 12b, the scanning electrodes 11b and the liquid crystal material layers 15.

Figure 22:
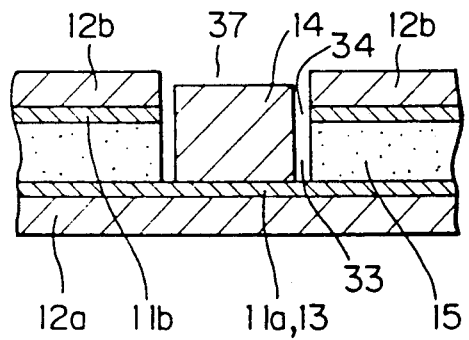
FIG. 22 shows an explanatory cross-section of still another embodiment of the LCD device of the present invention.

Referring to FIG. 22, the scanning electrodes are spaced from each other through vacant spaces 34, the liquid crystal material layer 15 has a plurality of vacant spaces 33 and the second base 12b has a plurality of openings 37 connected to the vacant spaces 33. The connected vacant spaces and openings contain the varistor layers 14, and therefore, the varistor layers 14 do not come into contact with the liquid crystal material layers 15, the scanning electrodes 11b and the second base 12b.

In the LCD device as shown in FIGS. 20 and 22, even when the liquid crystal layer 15 is very thin, it is not necessary to make the varistor layers very thin, and the varistor voltages of the varistor layers can be maintained at a constant level. Therefore, these types of LCD devices can have a small thickness and can be operated under a desired voltage. Further, the varistor layers are protected from undesirable contact with a solvent or additive in the liquid crystal material layer, especially the polymer-dispresed type liquid crystal material layer, and thus can maintain the varistor property at a constant level.

The above-mentioned types of LCD devices can be produced in the following manner.

Figure 23A:
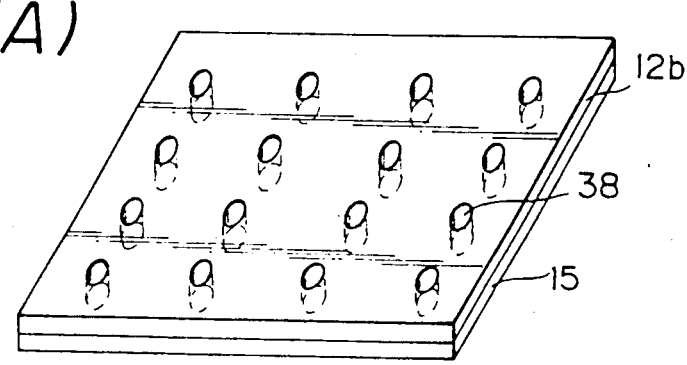
FIG. 23(A) shows an upper part of an LCD device of the present invention.

Referring to FIG. 23(A), a second base 12b has a plurality of scanning electrodes (not shown) spaced from each other through vacant spaces (not shown) and a liquid crystal material layer 15. The second base 12b has a plurality of openings connected to the vacant spaces (not shown) between the scanning electrodes (not shown), and the liquid crystal material layer 15 has a plurality of vacant spaces in the form of apertures connected to the vacant spaces (not shown) between the scanning electrodes (not shown). Thus, a plurality of apertures 38 extending through the second base 12b, the scanning electrode (not shown), and the liquid crystal material layer 15 are formed.

Figure 23B:
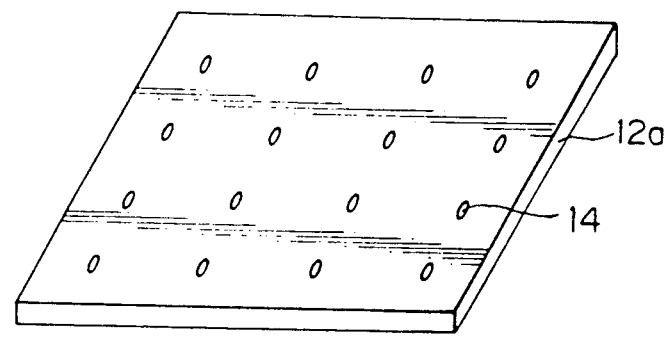
FIG. 23(B) shows a lower part of the LCD device of the present invention to be assembled with the upper part as shown in FIG. 23(A)

Referring to FIG. 23(B), a plurality of varistor layers 14 are formed on a first base 12a to connect therethrough a plurality of picture element electrodes (not shown) to a plurality of signal lines (not shown).

Figure 23C:
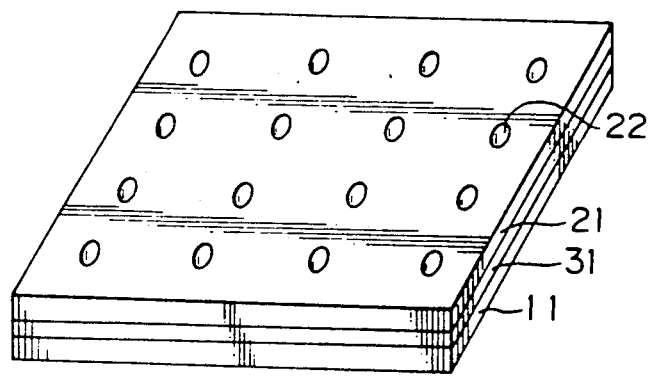
FIG. 23(C) shows an LCD device of the present invention consisting of the incorporated upper and lower parts as shown in FIGS. 23(A) and 23(B)

In FIG. 23(C), the second base 12b shown in FIG. 23(A) is laminated on the first base 12a shown in FIG. 23(B) so that the varistor layers 14 on the first base 12a are contained in the apertures 38 on the second base 12b, without coming into contact with the liquid crystal material layer 15, the scanning electrodes (not shown) and the second base 12b.

The openings in the second base 12b as shown in FIG. 23(A) can be replaced by concavities facing and connected to the vacant spaces between the scanning electrodes and then to the vacant spaces in the liquid crystal material layer.

The vacant spaces 38 can be in the form of a plurality of grooves each consisting of a groove formed between the liquid crystal material layers, a groove between the scanning electrode and a groove-shaped opening or concavity formed in the second base.

The vacant spaces in the form of grooves on the second base are useful for containing a number of varistor layers therein.

Figure 24:
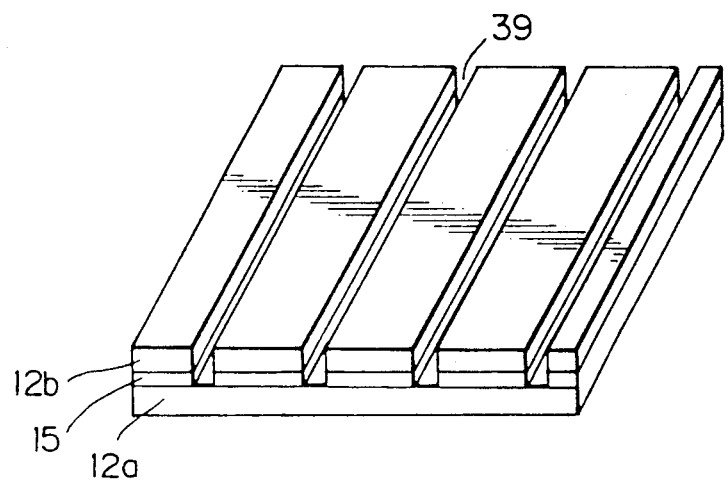
FIG. 24 shows another LCD device of the present invention.

Referring to FIG. 24, a plurality of groove-shaped vacant spaces 39 extend through the second base 12b, vacant spaces (not shown) formed between the scanning electrodes (not shown) and the liquid crystal material layer 15. A plurality of varistor layers (not shown) on the first base 12a are contained in the grooves 39 without coming into contact with the liquid crystal material layers 15, the scanning electrodes (not shown), and the second base 12b.

Figure 25:
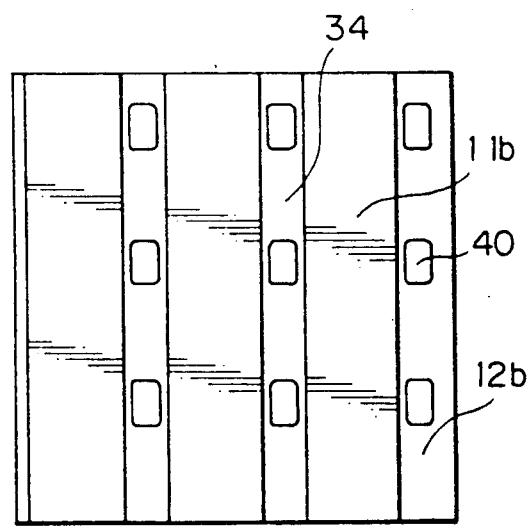
FIG. 25 shows another upper part of the LCD device of the present invention to be assembled with the lower part as shown in FIG. 24.

Referring to FIG. 25, a second base 12b has a plurality of apertures 40, and a plurality of scanning electrodes 11b are spaced from each other through groove-shaped vacant spaces 34. The apertures 40 open to the groove-shaped vacant spaces 34 between the scanning electrodes 11b.

The vacant spaces in the liquid crystal layer may be in the form of apertures or grooves connected to the aperture 40 in the second base 12b through the groove-shaped vacant spaces 34 between the scanning electrodes 11b.

EXAMPLES

The present invention will be further explained by way of specific examples, which in no way limit the invention.

EXAMPLE 1

ZnO particles were pelletized under a pressure of 200 kg/cm$^2$ and then sintered in an electric furnace at a temperature of 1200° C. The resultant ZnO pellets were pulverized in a mortar and the resultant fine particles were screened, to collect ZnO particles having a size of from 5 $\mu$m to 8 $\mu$m. To round off the particles, the particles were fired in an electric furnace at a temperature of 1200° C. The round ZnO particles were doped with 0.5 g of $MnO_2$ and $CO_2O_3$ per 100 g of ZnO and fired at a temperature of 1200° C. to provide varistor particles.

A paste was prepared from 10 g of the varistor particles, 5 g of glass beads, and 1 g of a binder consisting of polyvinyl acetate.

A plurality of picture element electrodes 11a consisting of ITO and a plurality of signal lines 13 were arranged on a first glass base 12a in the pattern shown in FIG. 8. The distance between the picture element electrodes 11a and the signal lines was 100 $\mu$m. The varistor particle paste was printed in accordance with the predetermined pattern on the first base 12a to connect therethrough the picture element electrodes 11a to the signal lines 13, and sintered at a temperature of 500° C., to form varistor layers 14.

Separately, an emulsion was prepared by mixing a solution of 10 g of polyvinyl alcohol in 90 g of distilled water, 30 g of liquid crystals and 1 g of a black dye.

The emulsion was applied to the surface of the first base 12a by using a doctor blade, to form a liquid crystal material layer having a thickness of 50 $\mu$m, and then dried. The dried liquid liquid crystal material layer had a thickness of 15 $\mu$m.

A plurality of scanning electrodes 11b having the shape as shown in FIG. 8 were formed on a second glass base 12b in accordance with a predetermined pattern. Then the emulsion was applied to the surface of the second base 12b by using a doctor blade, and dried to form a liquid crystal material layer.

The first and second bases 12a and 12b were laminated and side edges were sealed by an adhesive agent. In the resultant LCD device, the varistor layers did not face the scanning electrodes.

The resultant LCD device was operated by a multiplex drive (1/400 duty) under a voltage of ±150 V between the signal lines and the scanning electrodes, and the resultant display images had a contrast of 30:1 and were very clear.

EXAMPLE 2

An active matrix type LCD device was prepared in the following manner.

In the same manner as in Example 1, a first base having a plurality of picture element electrodes, a plurality of signal lines having branches, and a plurality of varistor layers arranged in the pattern shown in FIG. 11, was prepared. The picture element electrodes had a length of 5 mm and a width of 5 mm, and were spaced 1 mm apart. The number of picture elements electrodes was 400.

The varistor on-voltage was 135 volts and exhibited a small standard deviation of 3.1 volts. A mixture of 100 g of liquid crystals, 3 g of pleochroic dye, 30 g of an epoxy resin and 30 g of curing agent was applied to the first base by using a doctor blade, to form a liquid crystal material layer having a thickness of 17 $\mu$m.

The first base having the liquid crystal material layer was laminated on a second glass base having a plurality of scanning electrodes in the shape, size and locations as shown in FIG. 11. The laminate was left to stand at room temperature for 24 hours.

When the resultant LCD device was operated by an active matrix drive at a duty ratio of 1/128 under a voltage of $\pm 180$ V, the resultant display images were very clear and exhibited a contrast of 10 or more.

Comparative Example 1

The same procedures as in Example 2 were carried out except that a plurality of picture element electrodes, signal lines and varistor layers were arranged on a first base in the pattern shown in FIG. 1(C). The resultant comparative LCD device had a varistor on-voltage of 143 V and exhibited a large standard deviation of 9.5 V.

EXAMPLE 3

Referring to FIGS. 19(A), 19(B), 19(C) and 19(D), a first base 12a had a plurality of picture element electrodes 11a, a plurality of signal lines 13, and a plurality of varistor layers 14 arranged as shown in FIGS. 19(A) and 19(B), and a second base 12b had a plurality of scanning electrodes 11b and a plurality of liquid crystal material layer 15 arranged as shown in FIGS. 19(C) and 19(D).

The liquid crystal material layers 15 were formed from an emulsion consisting of 20 g of an aqueous solution containing 2 g polyvinyl alcohol, 5 g of liquid crystals and 0.2 g of black pleochroic dyes and had a thickness of 15 μm.

The varistor layer was formed by a printing method, had a length of 0.5 mm, and a width of 0.5 mm, a thickness of 13 μm, and exhibited a varistor voltage of 40 V $\pm 3$ V.

When the resultant LCD device was operated under an alternating voltage of 70 V at a duty ratio of 1:1, clear images having a contrast of 30 were displayed without cross-talk.

Comparative Example 2

The same procedures as in Example 3 were carried out except that a continuous liquid crystal material layer 15 was formed on the second base 12b.

When the resultant comparative LCD device was operated under an alternating voltage of 70 V at a duty ratio of 1:1, the displayed images were not clear and had a very poor contrast of 5 or less. When the alternating voltage was raised to 100 V, the displayed images became clear but undesirable cross-talk occurred.

EXAMPLE 4

The same procedures as in Example 3 were carried out except that the thickness of the varistor layers was 20 μm, the varistor voltage was 40 V $\pm 2$ V, and the second base had groove-shaped openings connected to the vacant spaces between the scanning electrodes and in the liquid crystal material layer as shown in FIG. 24.

When the resultant LCD device was operated under an alternating voltage of 70 V, the resultant images were very clear and had a very high contrast of 30. No cross-talk occurred.

EXAMPLE 5

The same procedures as in Example 4 were carried out except that the liquid crystal layer was prepared in accordance with Chemistry Letters, 679 (1979), from a solution of 2 g of polymethyl methacrylate, 5 g of liquid crystals and 0.2 g of black pleochroic dyes in 20 ml of 1,2-dichloroethane.

When the resultant LCD device was operated under an alternating voltage of 70 V, clear images were formed at a contrast of 25 without cross-talk.

We claim:

1. A liquid crystal display device comprising:
   a first transparent base;
   a plurality of picture element electrodes arranged on the first base;
   a plurality of signal lines for supplying electric signals to the picture element electrodes, the signal lines being arranged adjacent to the picture element electrodes on a surface of the first base;
   a plurality of varistor layers comprising varistor particles, the picture element electrodes being connected to the adjacent signal lines through the varistor layers;
   a second transparent base arranged in parallel to and spaced from the first base;
   a plurality of scanning electrodes arranged on a surface of the second base and facing toward and spaced from the picture element electrodes; and
   a liquid crystal material layer, comprising liquid crystals dispersed in a matrix consisting essentially of a polymeric material, arranged between the picture element electrodes and the scanning electrodes;
   said scanning electrodes being spaced from each other by a plurality of vacant spaces, said liquid crystal material layer having a plurality of vacant spaces formed therein which are continuous with the vacant spaces between the scanning electrodes, and said varistor layers facing the vacant spaces between the scanning electrodes in a direction perpendicular to the first and second base surfaces through the vacant spaces in the liquid crystal material layer without coming into contact with the liquid crystal material layer.

2. The device as claimed in claim 1, wherein the liquid crystal material layer contains pleochroic dyes.

3. The device as claimed in claim 1, wherein the varistor particles have a size of from 1 to 30 μm.

4. The device as claimed in claim 1, wherein the varistor particles are ZnO particles doped with at least one member selected from $BiO_3$, $Co_2O_3$, $MnO_2$ and $Sb_2O_3$.

5. The device as claimed in claim 1, wherein each scanning electrode is in the form of a polygonal plate in which a corner portion thereof closest to a varistor layer is cut to form a vacant space, and each varistor layer faces at least a portion of the vacant space.

6. The device as claimed in claim 1, wherein each picture element electrode is provided with a protrusion protruding toward and connected to the signal lines through a varistor layer and each scanning electrode faces only a portion of the picture element electrodes outside the protrusion.

7. The device as claimed in claim 1, wherein the scanning electrodes are spaced from each other through gaps and each varistor layer faces at least a portion of each gap.

8. The device as claimed in claim 1, wherein the signal lines have branches thereof extending between the picture element electrodes, and the varistor layers are formed to connect the signal line branches to two adjacent picture element electrodes.

9. The device as claimed in claim 1, wherein each varistor layer covers a side edge portion of each picture element electrode for 50% or more of the length of the side edge portion.

10. The device as claimed in claim 1, wherein the picture element electrodes are arranged in a zigzag pattern, the signal lines are arranged in a zigzag form among the picture element electrodes, and corner portions of the picture element electrodes facing each other are connected to bent portions of the signal lines through the varistor layers.

11. The device as claimed in claim 1, wherein the vacant spaces in the liquid crystal material layer are in the form of separate apertures.

12. The device as claimed in claim 1, wherein the vacant spaces in the liquid crystal material layer are in the form of separate grooves.

13. The device as claimed in claim 1, wherein the first and second bases are adhered to each other through adhesive material layers formed in portions of the vacant spaces in the liquid crystal material layer.

14. The device as claimed in claim 1, wherein the second base has concavities connected to the vacant spaces between the scanning electrodes and then to the vacant spaces in the liquid crystal material layer.

15. The device as claimed in claim 1, wherein the second base has openings connected to the vacant spaces between the scanning electrodes and then to the vacant spaces in the liquid crystal material layer.

16. The device as claimed in claim 1, wherein the liquid crystal material is in a nematic curvilinear aligned phase (NCAP).

17. The liquid display device according to claim 1, wherein the liquid crystal display device is configured such that the second transparent base and the plurality of scanning electrodes arranged on the surface of the second transparent base are not supported by said varistor layers.

* * * * *